April 21, 1964
H. S. BURLING
3,130,354
TEMPERATURE CONTROL
Filed Feb. 20, 1959
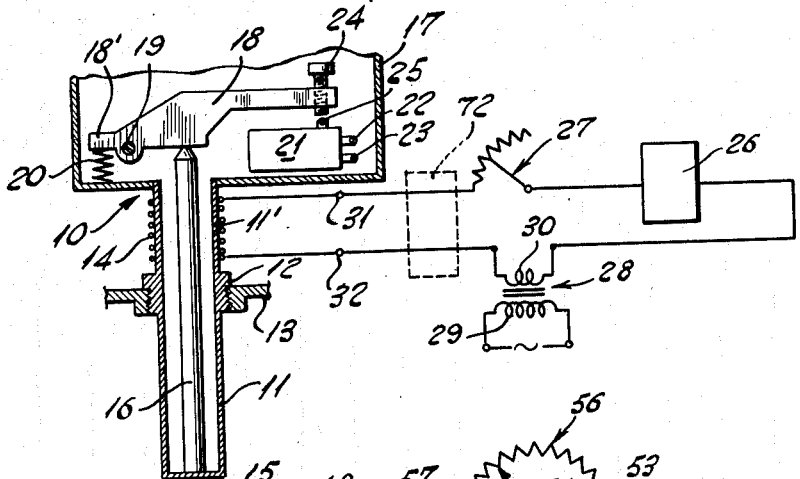
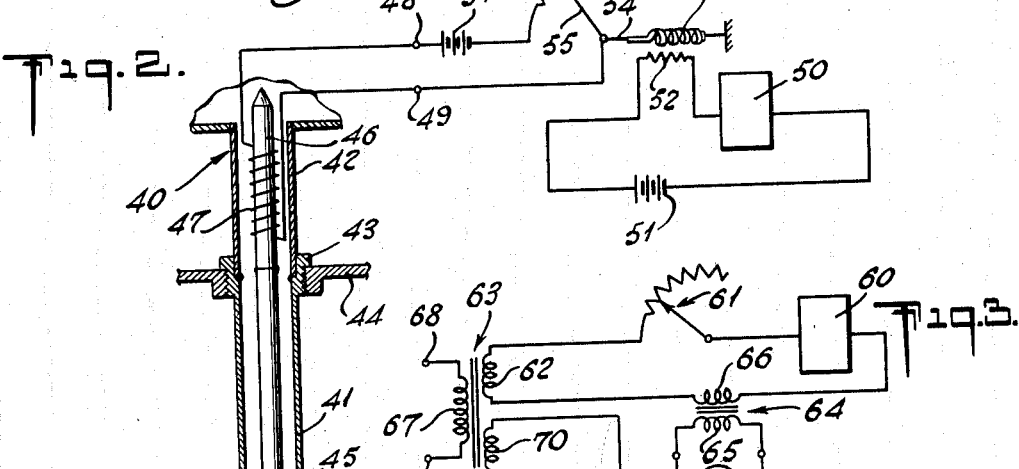
INVENTOR
Herbert S. Burling
BY
Morgan, Finnegan, Durham & Pine
ATTORNEY United States Patent Office 3,130,354
Patented Apr. 21, 1964

3,130,354
TEMPERATURE CONTROL
Herbert S. Burling, 16 River Road, Chatham, N.J.
Filed Feb. 20, 1959, Ser. No. 794,555
3 Claims. (Cl. 317—132)

This invention relates to temperature responsive devices and more specifically concerns a novel and improved temperature control responsive to temperatures of two or more individual zones.

While the apparatus in accordance with this invention is useful in a wide variety of applications, it is particularly applicable to the control of commercial and residential heating and air conditioning equipment such as hot water and hot air systems. In hot water systems, for instance, it has been found desirable to maintain the temperature of the water in the system at a level consistent with the outdoor temperature in order to provide more efficient and comfortable heating throughout the various seasons of the year.

In extremely cold weather, heat must be supplied to the space being heated at a greater rate than in mild weather and accordingly, the temperature of the heating medium should be maintained at a higher level. However, if the average temperature at which the heating medium is supplied to radiators or other heat dissipating devices is maintained at a high enough level for proper heating in cold weather, substantial overheating will be encountered in mild weather because of the mass of the system. Similarly, if a low temperature is utilized for the heating medium to produce the desired rate of heating in mild weather, the system would not function to supply adequate heat under very cold weather conditions. The same difficulties are encountered in connection with heating systems employing hot air, as well as air conditioning systems for cooling in the summer time.

This invention has, therefore, as one of its objects, the provision of a novel and improved heat control particularly useful for controlling the temperature of heating and cooling mediums whether they be water, air or other fluid, in accordance with variations in outdoor temperature and is characterized by its simplicity, dependability and ease of installation and maintenance. By reason of a novel and improved arrangement and combination of elements, a wide variety of operating conditions can be obtained and the control will maintain stability over long periods of time.

Another object of the invention resides in a novel and improved temperature controlling device utilizing a combination of mechanical and electrical temperature responsive elements which affords a highly versatile control readily adaptable for use in a wide variety of applications. By reason of the improved combination of elements, the control sensitivity and the range and type of operation, may be quickly and easily selected and the control will maintain such selected mode of operation for long periods of time.

Still another object of the invention resides in a novel and improved temperature control utilizing materials having differing temperature coefficients of expansion in combination with electrical temperature sensing means for modifying the responsive effect of the material to one ambient temperature by changes in a second temperature that may directly or indirectly affect the operation of the apparatus under control of the temperature responsive materials.

Still another object of the invention resides in a novel and improved temperature responsive control device.

The above and other objects of the invention will become more apparent from the following description and accompanying drawings forming part of this application.

In the drawings:
FIGURE 1 is a diagrammatic view of one embodiment of the invention with certain structural elements in cross section;

FIGURE 2 is a view similar to FIGURE 1 but illustrating a modified embodiment of the invention; and FIGURES 3 and 4 are diagrammatic view of alternate electric circuits for use with the temperature responsive controls shown in FIGURES 1 and 2.

One embodiment of a temperature control device in accordance with the invention is illustrated in FIGURE 1 and is particularly useful for controlling the air or water temperatures of heating and cooling systems, though it will become apparent as the description proceeds that the control is generally useful for controlling the operation of other types of equipment in response to variations of two different temperatures.

Specifically, the control generally denoted by the numeral 10 includes an elongated tubular member 11 having a threaded collar 12 about the outer surface thereof and positioned at a point between the ends. The position of the collar 12 on the tube 11 is determined by the nature of the control function to be performed. In the instant embodiment of the invention the tube 11 is fabricated of a maerial having a relatively high temperature coefficient of expansion and that portion of the tube below the collar 12 is normally disposed in the wall 13 of a heating device and responds to the temperature of the fluid, whether it be air or water. The upper portion 11' of the tube 11 is provided with a heating element 14 of resistance wire or other suitable material and is adapted to be heated by an electric current during the operation of the device. It is therefore evident that the total expansion of the tube 11 will be effected by both the temperature of the fluid surrounding the lower portion of the tube 11 as in FIGURE 1 and heat produced by the resistance element 14.

The bottom end of the tube 11 is closed by a plate 15 and an elongated member 16 extends through the center of the tube and rests against the plate 15. This member 16 is preferably of a temperature coefficient different from that of the tube 11 and extends upwardly beyond the open upper end of the tube 11. A switch housing 17 is secured to the upper end of the tube 11 by welding or other suitable means and contains a switch operating lever 18 pivoted at 19. A spring 20 interposed between portion 18' of the lever 18 and the housing 17 tends to urge the lever in a clockwise direction with the right hand portion of the lever bearing downwardly on the upper end of the elongated member 16. With this arrangement, expansion of the tube 11 will permit movement of the lever 18 in a clockwise direction, as illustrated, under the action of the spring 20. Contraction of the tube 11 will move the central member upwardly and urge the lever in a counterclockwise direction against the action of the spring 20. This angular motion of the lever 18 is utilized to operate a microswitch 21 or other suitable control mechanism. In the case of the microswitch as illustrated, motion of the lever functions to open and close a circuit between the microswitch terminals 22 and 23 for the control of the heating or cooling apparatus, as the case may be. Adjustment of the temperature at which the switch 21 is opened or closed may be effected by any suitable means as, for instance, by the screw 24 which threadably engages the right hand end of the lever 18 and can be adjusted toward or away from the actuating member 25 of the switch 21.

From the description thus far, it is evident that when the control is placed in a device 13 so that the lower portion of the tube responds to the temperature of a fluid medium, the switch 21 will be opened and closed in accordance with predetermined temperature changes in said medium and can be used to maintain the temperature of such medium at a predetermined level. In the case of a heating system such as a hot water system, for instance, it is desirable to increase the temperature of the water with an increase in outside temperature. This is attained through the utilization of an appropriate transducer denoted by the block 26 which responds to temperature changes and produces a change in an electrical characteristic. In the present embodiment of the invention, the transducer, which may be in the form of a temperature responsive resistance such as a thermistor or the like, is connected to a series circuit including a rheostat 27, resistance element 14 and a source of electrical energy 28. The source 28 is illustrated as a transformer having a primary 29 connected to a source of alternating current and a secondary 30 connected in series with the control circuit.

With the foregoing arrangement and with the transducer 26 positioned to respond to outside temperature and to provide an increase in resistance as outside temperature decreases, then a decrease in outside temperature will reduce the current flowing through the resistance element 14 and permit the upper portion 11' of the tube 11 to cool. This cooling effect tends to result in a shortening of the tube 11 and movement of the lever 18 in a counter-clockwise direction. If the switch 21 is a normally closed switch, then the movement of the lever 18 in a counter-clockwise direction will close the switch contacts and operate the heating mechanism should the temperature of the medium be below that value required for the lower outside temperature. As the medium contacting the lower portion of the tube 11 is heated, the tube will expand in length until the arm 18 functions to contact the switch operating member 25 and open the switch. Inasmuch as the resultant length of the tube is also affected by the resistance element 14, a low outside temperature will have produced substantial contraction of the tube portion 11' so that the lower portion of tube 11 must be heated to a degree that will compensate for the contraction of the portion 11' in order to open the switch 21. In doing so, it follows that the temperature of the medium surrounding the lower portion of tube 11 must attain an increased temperature.

The relationship of the temperature of the medium and the outside temperature can be attained in a number of ways, one of which is to proportion the parts of the tube heated by the resistance element 14 and by the medium being heated. Another procedure is to proportion the resistance of the transducer 26 relative to the heating element 14 and adjust the voltage of the secondary 30 of the transformer 28 so that the desired range of operation can be obtained. In order to modify the rate at which the heating current in the series circuit is modified by the transducer 26, a series rheostat 27 can be adjusted to increase or decrease the total circuit resistance. This rheostat also functions to limit the maximum current that can flow through the resistance element 14 so that in the case of a transducer 26 having a negative temperature coefficient of resistance, it is not possible for the transducer to lose its controlling function.

Should the device shown in FIGURE 1 be utilized for cooling purposes rather than heating, it is apparent that the switch 21 can be modified so that the switch closes when the lever 18 rotates in a clockwise direction to contact and actuate the switch operating member 25. In actual practice the elements of this control may be assembled in any desired manner as, for instance the transducer 26, the rheostat 27 and the voltage supply 28 may be furnished separate from the control 10, in which case these elements would be connected to appropriate terminals 31 and 32 carried by the control 10 and interconnected with the resistance element 14.

A modified embodiment of the invention is shown in FIGURE 2. In this embodiment the control generally denoted by the number 40 includes an outer tubular member comprising a lower section 41 having a high coefficient of expansion and an upper tubular section 42 having a low coefficient of expansion. These members are connected in end-to-end relationship and are provided with a threaded collar 43 surrounding the joinder of the sections 41 and 42 and providing mounting means for mounting the control in the wall 44 of a vessel containing the medium such as air or water to be heated or cooled. The inner member which corresponds to the elongated member 16 of FIGURE 1 is similarly formed in two sections, with the lower portion 45 having a low coefficient of expansion and the upper section 46 having a high coefficient of expansion. The upper end of the member 46 is adapted to engage and operate a switch controlling lever such as the lever 18, as shown and described in connection with FIGURE 1.

In this embodiment of the invention a resistance or heater element 47 surrounds the upper section 46 of the inner member and upon being heated will cause the section 46 to increase in length. This form of the invention has the advantage that the resistance element 47 is in a protected position within the control and affords an alternative mode of operation of the device. Current is supplied to the heating element 47 by means of appropriate terminals 48 and 49 connected with the heating element 47.

The electrical control switch responsive to ambient temperature illustrated in FIGURE 2 responds in a manner opposite to that described in connection with FIGURE 1. For instance, with a transducer 50 having a negative temperature coefficient of resistance, as the temperature, to which the transducer 50 responds, increases, the resistance of the transducer will decrease. This transducer is connected in series with a battery 51 or other suitable voltage supply and operates a resistance heater 52 surrounding a bimetallic element 53 in the form of a helix or other suitable configuration to produce rotary or angular motion as the temperature is increased and decreased. This bimetallic element is coupled by a mechanical linkage 54 to a movable contactor 55 forming part of the rheostat generally denoted by the numeral 56. In this way a change in temperature of the bimetallic element 53 will modify the position of the contactor 55 on the resistance element 56. The rheostat 56 is connected in series with a battery 57 or other voltage supply means and with the heating element 47 by connection to terminals 48 and 49.

Under the condition where the resistance of the transducer 50 decreases and results in an increase in the temperature of the heating element 52, then with the bimetallic element operable to increase the resistance of rheostat 56, decreased flow of current will be obtained in the heating element 47. This will cause expansion of the member 46. Assuming that the member 46 operates a lever switch as described in connection with FIGURE 1, then the amount of heat that must be imparted to the medium in order to expand the member 41 to open the switch is materially reduced. The effect of the transducer 50 on the temperature of the medium can be controlled in the same manner as described in connection with FIGURE 1, and a reversal of operation of the device can be obtained by reversing the mechanical coupling of the bimetal 53 to the rheostat 56.

A modified temperature control that may be used with either form of the inventions previously described is shown in FIGURE 3. In this form of the invention a transducer 60 responsive to change its resistance with changes in ambient temperature is connected in a closed series circuit with a rheostat 61, winding 62 of transformer 63 and a voltage supply 64 in the form of a transformer having a primary winding 65 and a secondary winding 66. A change in the temperature affecting the transducer 65 will modify the current in the series circuit and a change in this current will be reflected into the secondary winding 67 of the transformer 63. The terminals 68 and 69 of this transformer would be connected to the terminals 31 and 32 of the heater element 14 of FIGURE 1 or to the terminals 48 and 49 of the heater element 47 of FIGURE 2. A third winding 70 of the transformer 63 may be energized by either alternating or direct current to effect the desired operation. In the case of alternating current, applied to the winding 70, this winding may be energized in a direction equal and opposite to the winding 62 when the transducer 60 is at a predetermined mean temperature and energy will be delivered to the winding 67 only when there is an unbalance as between the windings 62 and 70. Amplification of the effect of the signal applied to the winding 62 can be obtained by utilizing an appropriate direct current on the winding 70 which would then cause the transformer 73 to function in the nature of a magnetic amplifier.

The form of the invention shown in FIGURE 4 is similar to the circuit shown in FIGURE 1, which included a rheostat 27 and a voltage source 28. In this embodiment, however, the transducer 26 is illustrated in the form of resistance coils 26' formed of a resistance wire having a positive temperature coefficient of resistance so that the resistance of the wire will increase with an increase in temperature. Utilization of a transducer having a positive temperature coefficient would result in a reversal of the effect of outside temperature on the temperature of the medium, a condition which would be required in controlling air conditioning or cooling systems. This form of the invention may be used with the devices of FIGURES 1 and 2 by connecting the terminals 31' and 32' to terminals 31, 32 or 48, 49 of FIGURES 1 and 2 respectively.

In certain applications it may be desirable to obtain increased sensitivities and in such instances appropriate amplifiers may be used. The embodiment of the invention shown in FIGURE 1, may therefore utilize an amplifier shown in dotted outline and denoted by the numeral 72. The amplifier may be of conventional construction and either of the A.C. or D.C. type depending upon the character of the signal to be amplified. In the instant case, the source is alternating so that an alternating current amplifier may be used. Should an amplifier be used with a D.C. supply as in the case of FIGURE 2, then of course a D.C. amplifier would be used. As amplifiers are well known, specific circuiting has not been shown though it is understood that they may include vacuum tubes, transistors, magnetic devices or other suitable means. In order to insure desired stability of the invention as shown and described, it is further understood that the voltage supplies be appropriately regulated and amplifiers, if any are used, should be properly stabilized. Moreover the illustrated forms of the invention, while shown with specific types of voltage suppliers, may have either A.C. or D.C. supplies as desired.

It is to be understood, however, that transducers having either positive or negative temperature coefficients may be used in any application provided however, that appropriate circuits or constructions are employed to utilize such changes in the desired manner. Similarly the temperature coefficient of expansion of the control members may be modified as desired and even materials utilizing negative temperature coefficients may be employed in accordance with the teachings of this invention to produce the desired ends.

While only certain embodiments of the invention have been illustrated and described, it is apparent that other modifications, alterations and changes may be made without departing from the true scope and spirit thereof.

What is claimed is:
1. A temperature control comprising an elongated composite tubular member formed of two sections joined in end to end relationship with one section having a high temperature coefficient of expansion and the other section having a relatively low temperature coefficient of expansion, a second elongated composite longitudinal member within said tubular member and formed of two sections joined in end to end relationship with one section having a low temperature coefficient of expansion and the other section having a high temperature coefficient of expansion, means fixedly positioning one end of the composite tubular member relative to the adjoining end of said second composite member, switch means carried by the other end of one of said members and engaging the corresponding end of the other of said members and responsive to changes in the relative positions of said other ends of said members, a heating coil surrounding the high temperature coefficient section of said second composite member and adapted to be controlled from an electric circuit responsive to changes in temperature of one temperature zone, and means supporting said members with the high temperature coefficient section of said tubular member in another temperature zone whereby said switch means will be actuated in accordance with the changes in temperature of both of said zones.

2. A temperature control according to claim 1 wherein the high temperature coefficient section of the tubular member is substantially coextensive with the low temperature coefficient section of the second member.

3. A temperature control comprising an elongated composite tubular member formed of two sections joined in end to end relationship with one section having a high temperature coefficient of expansion and the other section having a relatively low temperature coefficient of expansion, a second elongated composite longitudinal member within said tubular member and formed of two sections joined in end to end relationship with one section having a low temperature coefficient of expansion and the other section having a high temperature coefficient of expansion, means fixedly positioning one end of the composite tubular member relative to the adjoining end of said second composite member, switch means carried by the other end of one of said members and engaging the corresponding end of the other of said members and responsive to changes in the relative positions of said other ends of said members, a heating coil surrounding the high temperature coefficient section of said second composite member and adapted to be controlled from electric circuit means responsive to changes in temperature of one temperature zone, and means supporting said members with the high temperature coefficient section of said tubular member in another temperature zone whereby said switch means will be actuated in accordance with the changes in temperature of both of said zones.

References Cited in the file of this patent
UNITED STATES PATENTS

| | | |
|---|---|---|
| 1,416,851 | McNeil | May 23, 1922 |
| 2,315,984 | Satchwell | Apr. 6, 1943 |
| 2,346,592 | Lehane | Apr. 11, 1944 |
| 2,505,938 | Biermann | May 2, 1950 |
| 2,932,456 | Deubel | Apr. 12, 1960 |

FOREIGN PATENTS

| | | |
|---|---|---|
| 566,624 | France | Nov. 24, 1923 |
| 553,336 | Great Britain | May 18, 1943 |